United States Patent
Ikeda

(10) Patent No.: US 9,312,563 B2
(45) Date of Patent: Apr. 12, 2016

(54) METHOD FOR MANUFACTURING SECONDARY BATTERY

(71) Applicant: Hiroaki Ikeda, Toyota (JP)

(72) Inventor: Hiroaki Ikeda, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/420,433

(22) PCT Filed: Jun. 6, 2013

(86) PCT No.: PCT/JP2013/003588
§ 371 (c)(1),
(2) Date: Feb. 9, 2015

(87) PCT Pub. No.: WO2014/030279
PCT Pub. Date: Feb. 27, 2014

(65) Prior Publication Data
US 2015/0221972 A1  Aug. 6, 2015

(30) Foreign Application Priority Data

Aug. 22, 2012  (JP) .................. 2012-183107

(51) Int. Cl.
| | | |
|---|---|---|
| *H01M 2/00* | (2006.01) | |
| *H01M 10/04* | (2006.01) | |
| *H01M 2/02* | (2006.01) | |
| *H01M 2/36* | (2006.01) | |
| *H01M 10/44* | (2006.01) | |
| *H01M 10/0587* | (2010.01) | |

(52) U.S. Cl.
CPC .............. *H01M 10/049* (2013.01); *H01M 2/00* (2013.01); *H01M 2/02* (2013.01); *H01M 2/36* (2013.01); *H01M 10/0431* (2013.01); *H01M 10/446* (2013.01); *H01M 10/0587* (2013.01); *Y10T 29/4911* (2015.01)

(58) Field of Classification Search
CPC .................................. H01M 2/00; H01M 2/02
USPC ......................................................... 29/623.2
See application file for complete search history.

(56) References Cited

U.S. PATENT DOCUMENTS

| | | |
|---|---|---|
| 6,156,080 A | 12/2000 | Kumeuchi et al. |
| 6,232,015 B1 | 5/2001 | Wyser |
| 2003/0039883 A1 | 2/2003 | Notten et al. |
| 2008/0241676 A1* | 10/2008 | Naoi ................ H01M 2/0212 429/179 |
| 2011/0097615 A1* | 4/2011 | Goh ................ H01M 2/0275 429/94 |

FOREIGN PATENT DOCUMENTS

| | | |
|---|---|---|
| CN | 1547782 A | 11/2004 |
| CN | 101276897 A | 10/2008 |

(Continued)

*Primary Examiner* — Basia Ridley
*Assistant Examiner* — James Erwin
(74) *Attorney, Agent, or Firm* — Sughrue Mion, PLLC

(57) ABSTRACT

Provided is a method for manufacturing a secondary battery that can ensure a favorable charging state. A method for manufacturing a secondary battery according to an embodiment of the invention is a method for manufacturing a secondary battery where a wound body having a positive electrode sheet, a separator and a negative electrode sheet wound in a layered state in a housing, which includes a first step of accommodating the wound body into the housing; and a second step of hot-pressing the wound body through the housing from outside of the housing, the wound body being accommodated in the housing. The method preferably includes a third step of performing initial charging, confining a part substantially the same as a part where the wound body is hot-pressed through the housing in the second step.

4 Claims, 3 Drawing Sheets

(56) References Cited

FOREIGN PATENT DOCUMENTS

| | | |
|---|---|---|
| CN | 101971388 A | 2/2011 |
| JP | 60-56376 A | 4/1985 |
| JP | 10-302827 A | 11/1998 |
| JP | 11-111339 A | 4/1999 |
| JP | 2000067821 A | 3/2000 |
| JP | 2002-110252 A | 4/2002 |
| JP | 2002117825 A | 4/2002 |
| JP | 2011216408 A | 10/2011 |
| JP | 2011-258493 A | 12/2011 |

* cited by examiner

RELATED ART

METHOD FOR MANUFACTURING SECONDARY BATTERY

CROSS REFERENCE TO RELATED APPLICATIONS

This is a National Stage of International Application No. PCT/JP2013/003588 filed Jun. 6, 2013, claiming priority based on Japanese Patent Application No. 2012-183107 filed Aug. 22, 2012, the contents of all of which are incorporated herein by reference in their entirety.

TECHNICAL FIELD

The present invention relates to a method for manufacturing a secondary battery and, for example, to a method for manufacturing a secondary battery in which a wound body having a positive electrode sheet, a separator and a negative electrode sheet wound in a layered state in a housing.

BACKGROUND ART

A secondary battery (accumulator battery) such as a lithium-ion battery or a nickel-metal-hydride battery grows in importance as a built-in vehicle power supply or a power supply for a personal computer and a portable terminal. A secondary battery has a structure in which a wound body having a positive electrode sheet, a separator and a negative electrode sheet wound in a layered state in a housing.

For example, according to the method for manufacturing a secondary battery disclosed in Patent Literature 1, after hot pressing of a wound body, the wound body is accommodated in a housing and then initial charging is performed. Specifically, as shown in FIG. 5, the upper and lower surfaces of a wound body 101 are hot-pressed. Then, as shown in FIG. 6, the hot-pressed wound body 101 is accommodated in a housing 102, and further electrolyte 103 is filled into the housing 102. Finally, as shown in FIG. 7, initial charging is performed, confining the upper and lower surfaces of the housing 102 in which the wound body 101 and the electrolyte 103 are accommodated. In this manner, by hot pressing of the wound body, it is possible to reduce the thickness of the wound body and achieve easier accommodation into the housing and size reduction of the secondary battery.

CITATION LIST

Patent Literature

[PTL 1] Japanese Unexamined Patent Application Publication No. 10-302827

SUMMARY OF INVENTION

Technical Problem

At the time of initial charging, the upper and lower surfaces of the housing 102 in which the wound body 101 and the electrolyte 103 are accommodated are confined as shown in FIG. 7 so that it is similar to the way it is used in a mobile body or the like, for example. At this time, because the corners of the housing 102 are not easy to be deformed and the upper and lower surfaces of the wound body 101 cannot be suitably confined through the housing 102, the housing 102, which in turn the wound body 101, is confined using a spacer 104, for example.

However, because the wound body 101 is not heated when the wound body 101 is confined to make it similar to the way it is used in a mobile body or the like, the deformation of the wound body 101 by confinement is small, and it is difficult to make it similar to the way it is used in a mobile body or the like. Further, the shape after the deformation of the wound body 101 by confinement is not stable, and the distance between the electrodes of the wound body 101 is thus not stable, which makes it difficult to ensure a favorable charging state.

The present invention has been accomplished to solve the above problems and an object of the present invention is thus to provide a method for manufacturing a secondary battery that can ensure a favorable charging state.

Solution to Problem

A method for manufacturing a secondary battery according to one aspect of the invention is a method for manufacturing a secondary battery where a wound body having a positive electrode sheet, a separator and a negative electrode sheet wound in a layered state in a housing, the method including a first step of accommodating the wound body into the housing, and a second step of hot-pressing the wound body through the housing from outside of the housing, the wound body being accommodated in the housing.

The above-described method for manufacturing a secondary battery preferably includes a third step of performing initial charging, confining a part substantially the same as a part where the wound body is hot-pressed through the housing in the second step.

In the above-described method for manufacturing a secondary battery, it is preferred that the second step hot-presses the wound body through one principal surface and another principal surface of the housing, excluding corners of the housing.

In the above-described method for manufacturing a secondary battery, it is preferred that the second step is performed under conditions where a degree of vacuum is 0.5 kPa or less, a temperature is 90° C. to 110° C., and a load is 0.75 kN to 3.0 kN.

The above-described method for manufacturing a secondary battery preferably includes a fourth step of filling electrolyte into the housing between the second step and the third step.

Advantageous Effects of Invention

As described above, according to the present invention, it is possible to provide a method for manufacturing a secondary battery that can ensure a favorable charging state.

DESCRIPTION OF EMBODIMENTS

A preferred embodiment of the present invention will be described hereinafter with reference to the attached drawings. The present invention, however, is not limited to the below-described embodiment. Further, the following description and the attached drawings are appropriately shortened and simplified to clarify the explanation. The directions defined in this specification are based on the directions when each drawing is viewed from the front.

A method for manufacturing a secondary battery according to this embodiment enables hot pressing of a wound body in the state similar to the way a housing is confined at initial charging, which in turn the way it is used in a mobile body or the like, for example, and thereby ensures a favorable charging state.

Figure 1:
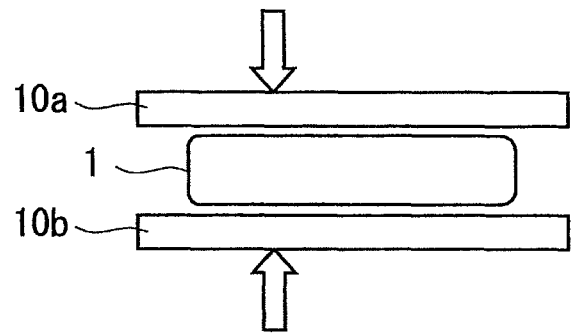
FIG. 1 is a view schematically showing a step of a method for manufacturing a secondary battery according to an embodiment of the invention.

A flow of a method for manufacturing a secondary battery according to this embodiment is described first. As shown in FIG. 1, one principal surface (an upper surface in this embodiment) and the other principal surface (a lower surface in this embodiment) of a wound body 1 are pressed.

For example, the wound body 1 is placed between an upper press plate 10*a* and a lower press plate 10*b* of a hydraulic press machine, and the wound body 1 is pressed between the upper press plate 10*a* and the lower press plate 10*b*. The wound body 1 is thereby pressed from above and from below, so that the wound body 1 can be easily accommodated into a housing 2. The wound body 1 is composed of a positive electrode sheet, a separator and a negative electrode sheet wound in a layered state, though not shown, like a typical wound body.

Figure 2:
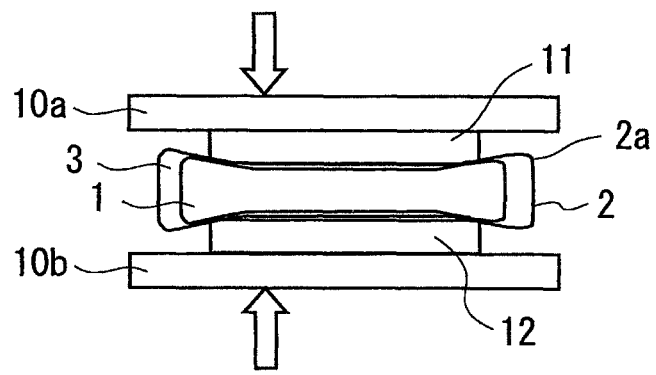
FIG. 2 is a view schematically showing a step of a method for manufacturing a secondary battery according to an embodiment of the invention.

Next, the wound body 1 is accommodated in the housing 2 as shown in FIG. 2. The housing 2 includes a basket part having an opening through which the wound body 1 is inserted and a cover part which covers the opening, and the cover part is provided with a positive electrode terminal that is electrically connected to an end of the positive electrode sheet and a negative electrode terminal that is electrically connected to an end of the negative electrode sheet, though not shown.

Specifically, the wound body 1 is accommodated into the basket part, the end of the positive electrode sheet of the wound body 1 is electrically connected to the positive electrode terminal of the cover part, and the end of the negative electrode sheet of the wound body 1 is electrically connected to the negative electrode terminal of the cover part. Then, the cover part is joined to the basket part to thereby seal up the housing 2.

Note that, in the method for manufacturing a secondary battery according to related art, the wound body is not heated when the wound body is confined to make it similar to the way it is used in a mobile body or the like as described above. Therefore, the deformation of the wound body is small when the wound body is confined, and it is difficult to make it similar to the way it is used in a mobile body or the like. Accordingly, the wound body is deformed largely when it is used in a mobile body or the like. Further, the shape of the wound body after confining the wound body is not stable. Therefore, the distance between the electrodes of the wound body varies largely between at the time of initial charging and at the time of use in a mobile body or the like, which causes unevenness of charging and increase in resistance.

In view of the above, a part that is substantially the same as a part that is confined when used in a mobile body or the like is hot-pressed in this embodiment. To be specific, in this embodiment, in order to make it similar to the way it is used in a mobile body or the like, a part that is easy to confine the wound body 1, which is areas excluding corners 2*a* of the housing 2, being inner of the corner 2*a* on the upper surface of the housing 2 and inner of the corner 2*a* on the lower surface of the housing 2, is confined at the time of initial charging as shown in FIG. 3.

Therefore, in a step of hot-pressing the wound body 1, the areas being inner of the corner 2*a* on the upper surface of the housing 2 and inner of the corner 2*a* on the lower surface of the housing 2 in which the wound body 1 is accommodated are hot-pressed as shown in FIG. 2.

For example, a spacer 11 is placed between the upper press plate 10*a* of a hydraulic press machine and the upper surface of the housing 2, and further a spacer 12 is placed between the lower press plate 10*b* of the hydraulic press machine and the lower surface of the housing 2. Then, the upper press plate 10*a* and the lower press plate 10*b* are heated to apply heat to the housing 2 through the spacer 11 and the spacer 12, and further the housing 2 is pressed between the upper press plate 10*a* and the lower press plate 10*b*, thereby heat pressing the wound body 1 through the housing 2. After that, in the state where heat pressing of the wound body 1 is done, electrolyte 3 is filled inside the housing 2.

Figure 3:
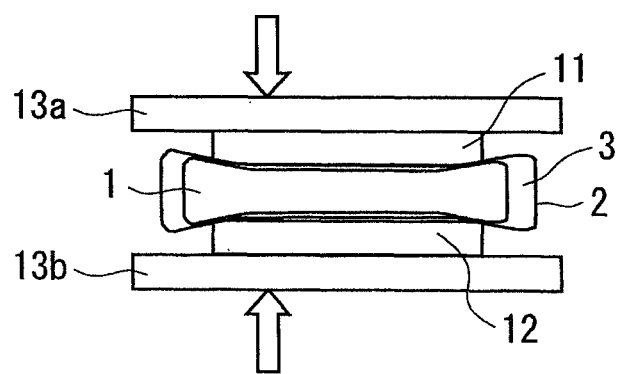
FIG. 3 is a view schematically showing a step of a method for manufacturing a secondary battery according to an embodiment of the invention.

Then, initial charging is performed, confining the housing 2 in which the wound body 1 and the electrolyte 3 are accommodated as shown in FIG. 3. At this time, a part that is substantially the same as the hot-pressed part of the wound body 1 is confined as described above. Specifically, the areas being inner of the corner 2*a* on the upper surface of the housing 2 and inner of the corner 2*a* on the lower surface of the housing 2 in which the wound body 1 is accommodated are confined.

For example, a spacer 11 is placed between an upper confining plate 13*a* of a confining means and the upper surface of the housing 2, and further a spacer 12 is placed between a lower confining plate 13*b* of the confining means and the lower surface of the housing 2. Then, initial charging is performed, confining the wound body 1 between the upper confining plate 13*a* and the lower confining plate 13*b* through the housing 2.

Because the above-described method for manufacturing a secondary battery hot-presses a part that is substantially the same as a part that is confined at the use in a mobile body or the like, it is possible to press and fix the wound body 1 in the state similar to the way it is used in a mobile body or the like. Therefore, the deformation of the wound body 1 is small between at the time of initial charging and at the time of use in a mobile body or the like, the distance between the electrodes of the wound body 1 is stable, and thus unevenness of charging is not likely to occur and an increase in resistance can be suppressed when used in a mobile body or the like. It is thereby possible to ensure a favorable charging state.

Figure 4:
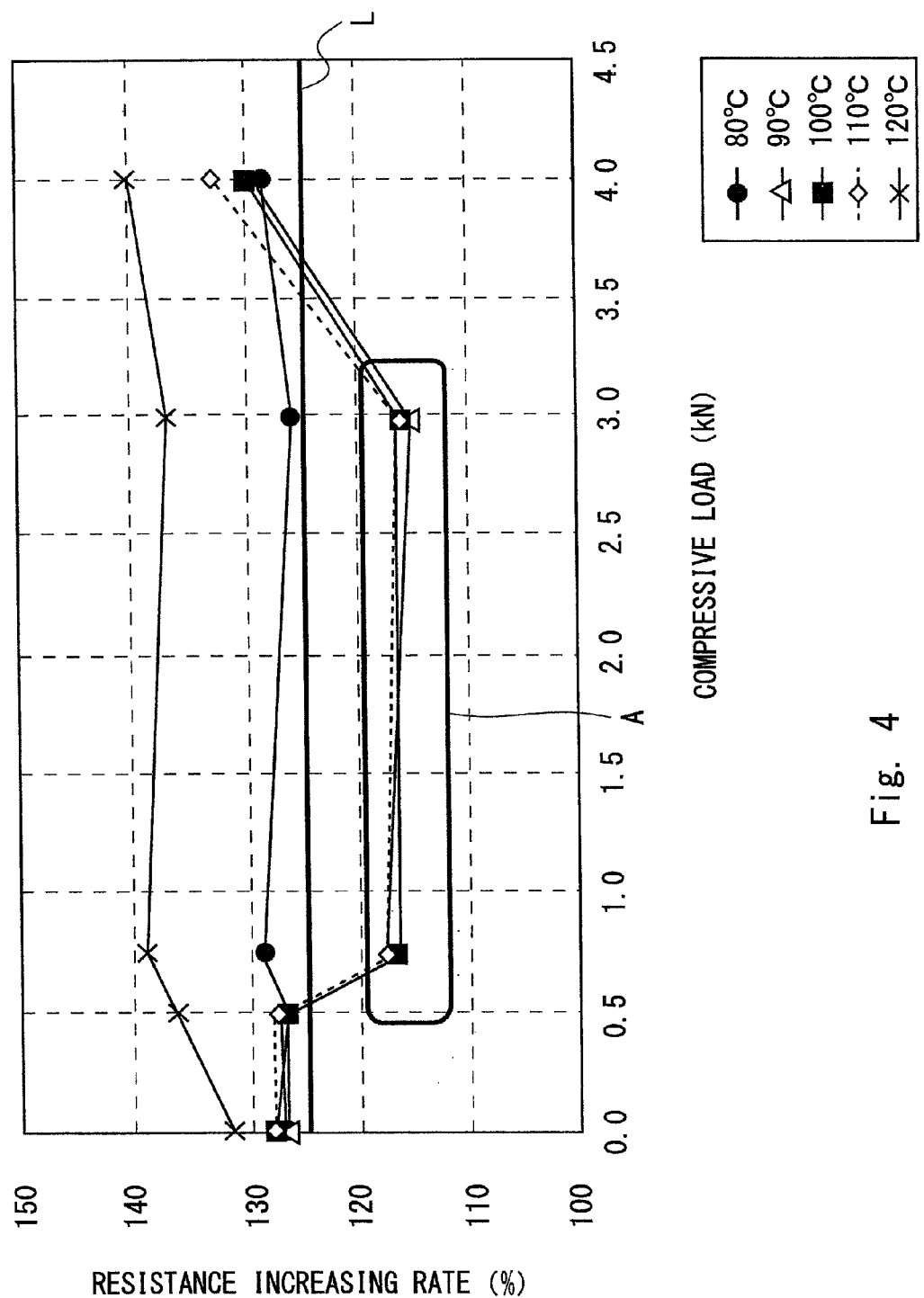
FIG. 4 is a view showing a relationship of a heating temperature of a wound body, a compressive load and a resistance increasing rate after charge and discharge.
Figure 5:
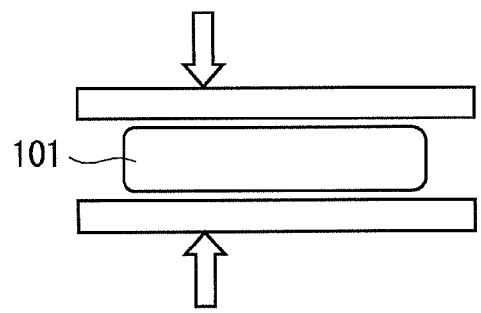
FIG. 5 is a view schematically showing a step of a method for manufacturing a secondary battery according to a related art.
Figure 6:
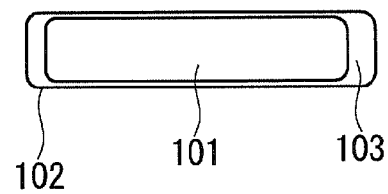
FIG. 6 is a view schematically showing a step of a method for manufacturing a secondary battery according to a related art.
Figure 7:
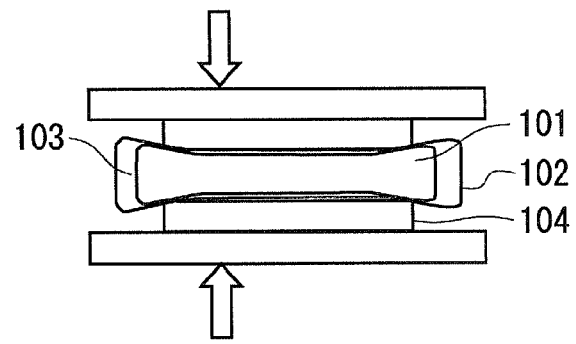
FIG. 7 is a view schematically showing a step of a method for manufacturing a secondary battery according to a related art.

Conditions for heat-pressing the wound body 1 are described hereinbelow. FIG. 4 is a view showing a relationship of a heating temperature of the wound body 1, a compressive load of the wound body 1 and a resistance increasing rate after charge and discharge. The heating temperature is 80° C., 90° C., 100° C., 110° C., and 120° C. A compressive load is 0 to 4.0 kN.

As is apparent from the region A in FIG. 4, a resistance increasing rate is low under the conditions where a heating temperature is 90° C. to 110° C. and a compressive load is 0.75 kN to 3.0 kN, and a favorable charging state can be achieved if the wound body 1 is heat-pressed in such conditions. Note that the straight line L in the figure is data of a secondary battery manufactured by the method according to related art.

Note that, in order to prevent local oxidation of the wound body 1, it is preferred to heat-press the wound body 1 under the vacuum condition of 0.5 kPa or less.

Although an embodiment of a method for manufacturing a secondary battery according to the present invention is described above, the invention is not limited to thereto, and various changes in form and details may be made therein without departing from the technical idea of the present invention. For example, although load and heat are applied to the upper and lower surfaces of the wound body 1 in the above-described embodiment, load and heat may be applied to any surfaces of the wound body 1 as long as they are opposite to each other.

This application is based upon and claims the benefit of priority from Japanese patent application No. 2012-183107, filed on Aug. 22, 2012, the disclosure of which is incorporated herein in its entirety by reference.

INDUSTRIAL APPLICABILITY

The present invention is applied to a method for manufacturing a secondary battery in which a wound body having a positive electrode sheet, a separator and a negative electrode sheet wound in a layered state in a housing, for example.

REFERENCE SIGNS LIST

1 WOUND BODY
2 HOUSING
2a CORNER
3 ELECTROLYTE
10a UPPER PRESS PLATE
10b LOWER PRESS PLATE
11, 12 SPACER
13a UPPER CONSTRAINING PLATE
13b LOWER CONSTRAINING PLATE
101 WOUND BODY
102 HOUSING
103 ELECTROLYTE
104 SPACER

The invention claimed is:

1. A method for manufacturing a secondary battery including a wound body having a positive electrode sheet, a separator and a negative electrode sheet wound in a layered state in a housing, comprising:
   a first step of accommodating the wound body into the housing and covering an opening of the housing with a cover;
   a second step of, after the first step, hot-pressing the wound body through the housing from outside of the housing, the wound body being accommodated in the housing, and the opening of the housing being covered with the cover; and
   a third step of, after the second step, filling electrolyte into the housing.

2. The method for manufacturing a secondary battery according to claim 1, further comprising:
   a fourth step of, after the third step, performing initial charging; while confining a part substantially the same as a part where the wound body is hot-pressed through the housing in the second step.

3. The method for manufacturing a secondary battery according to claim 1, wherein
   the second step hot-presses the wound body through one principal surface and another principal surface of the housing, excluding corners of the housing.

4. The method for manufacturing a secondary battery according to claim 1, wherein
   the second step is performed under conditions where a degree of vacuum is 0.5 kPa or less, a temperature is 90° C. to 110° C. and a load is 0.75 kN to 3.0 kN.

* * * * *